Aug. 11, 1959  L. W. HUSSEY  2,899,642
TRANSISTOR TEST SET
Filed April 13, 1956

INVENTOR
L. W. HUSSEY
BY
Walter M. Hill
ATTORNEY

United States Patent Office 2,899,642
Patented Aug. 11, 1959

2,899,642

TRANSISTOR TEST SET

Luther W. Hussey, Sparta, N.J., assignor to Bell Telephone Laboratories, Incorporated, New York, N.Y., a corporation of New York Application April 13, 1956, Serial No. 577,978

9 Claims. (Cl. 324—158)

This invention relates to the art of electrical measurements and more particularly to an apparatus adapted for testing transistors.

Most of the test apparatus currently available for testing transistors is of rather formidable size and embodies considerable complexity. Some of them involve the use of oscilloscopes which are not readily portable when measurements are to be made in the field. A simple compact testing apparatus with a self-contained power supply is needed by servicemen in the field and by radio repairmen. For such purposes, there are only two quantities of special interest. These are the collector current with the emitter circuit open, commonly denoted $I_{co}$, and the current amplification factor denoted by the Greek letter $\alpha$. A determination of these two quantities will enable a serviceman to form an accurate judgment as to the serviceability of a transistor.

It is, therefore, the object of this invention to provide a simple, portable test set for transistors capable of rapidly indicating the collector current with the emitter circuit open and the current amplification factor.

The foregoing object is achieved by this invention which provides a terminal means for receiving a transistor to be tested, a source of substantially constant direct current, a current indicator, and suitable switching means adapted to connect the current indicator and the constant direct current source in a series circuit with the collector and base electrodes of the transistor under test, thus providing means for measuring the required collector current. The switching means further provides a circuit connecting the constant current source in series with the collector and emitter electrodes and at the same time connecting the current indicating means between the collector and base electrodes, thus providing means for directly indicating the current amplification factor. Further, switching means reverses the direction of the current and the polarity of the current indicator so that the apparatus is adapted for measuring either a PNP or an NPN type transistor.

The invention may be better understood by referring to the accompanying drawings in which.

Figure 3:
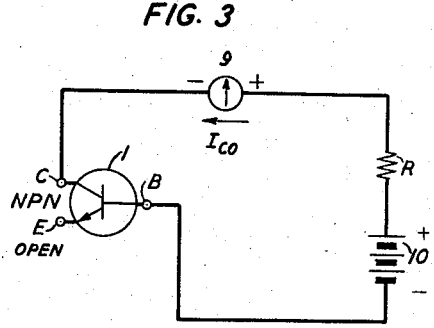
Figure 4:
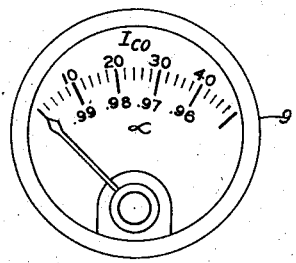

Fig. 3 discloses the circuit set up for indicating the collector current with the emitter circuit open; and Fig. 4 discloses a meter scale in accordance with a preferred embodiment of the invention.

Figure 1:
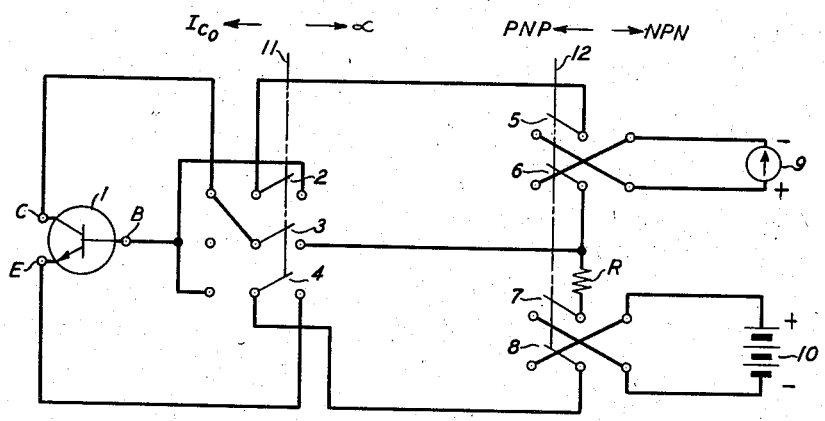
Fig. 1 shows the complete circuit of a preferred embodiment of the invention.

Referring now to Fig. 1, a transistor 1 to be tested is shown connected to the test terminals B, C and E, respectively designating the base, collector and emitter electrodes of the transistor. These test terminals may comprise terminals of a standard transistor socket. In accordance with this preferred embodiment of the invention, a three-pole, double-throw switch 11 is adapted to convert the test circuits from one measuring the current amplification factor to one measuring the required collector current. Terminals of this switch are connected to a four-pole reversing switch 12, two poles of which are connected to the meter circuit 9 and the remaining two poles to a source of direct current 10. In one position of switch 12, source 10 and meter 9 are connected in one polarity to the test circuits, while the other position of switch 12 reverses both of their polarities. This switch adapts the circuit for testing either PNP or NPN type transistors. It has been found that the small signal current amplification factor for a satisfactory transistor approximates the value obtained by direct-current so that measurements made with this invention are quite adequate for field use.

The circuits of Fig. 1 are set up for testing the current amplification factor of NPN type transistors by operating both switch 11 and switch 12 to the right. The resulting circuit is identical with that shown in Fig. 2. In tracing the circuits through Fig. 1, it will be noted that the collector test terminal C is connected by way of the switch blade 3 of switch 11 to the junction between a resistor R and switch blade 6 of switch 12. The socket terminal B is connected by way of switch blade 2 of switch 11 to switch blade 5 of switch 12. The socket terminal E is connected by way of switch blade 4 of switch 11 to switch blade 8 of switch 12. In switch 12 it will be noted that switch blade 5 is connected to the negative terminal of current indicator 9 while the positive terminal of indicator 9 connects to resistor R by way of switch blade 6. The lower terminal of resistor R is connected to the positive terminal of source 10 by way of switch blade 7, while the negative terminal of source 10 is connected to the switch blade 8. By tracing these paths as described, it will be found that they are identical to the circuit of Fig. 2. It will also be observed that when switch 12 is thrown to the left, the circuit is again identical with Fig. 2 except that the polarity of source 10 is reversed and the polarity of indicator 9 is reversed. In either case, the polarities are such that the current is caused to enter the collector electrode of the transistor under test in its reverse conducting direction.

With switch 11 of Fig. 1 thrown to the left, it will be noted that the circuit of Fig. 3 is established. The circuit paths are so simple that from the description already given for Fig. 2 no further description of the circuits establishing Fig. 3 is necessary. Here again it may be mentioned that the operation of switch 12 causes a reversal of the polarities of the source 10 and current indicator 9 and that the polarities are such as to cause the current to enter the collector electrode in its reverse conducting direction.

While not limited to any particular kind of current indicator, voltage supply or size of resistor R, it has been found convenient to use a current indicator 9 having a full scale deflection of 50 microamperes, a series resistance of 4,500 ohms, and a battery of 4.5 volts for the supply 10. This battery can be made up with three small flashlight cells so that the entire apparatus is readily enclosed in a small case of pocket size. Where a 50 microampere meter is used, the scale is preferably calibated as shown in Fig. 4. It will be noted that the lower indicia carry calibrations for the current amplification factor varying from 1 to 0.95.

In the ordinary use of this instrument for testing transistors, the transistors is inserted in the socket and switch 12 is moved in the appropriate direction for the type of transistor being tested. Switch 11 is then moved to the left as shown in Fig. 1 to measure the collector current. As previously described, this establishes the circuit shown in Fig. 3. When making this test, care must be exercised to note whether or not the current drawn is excessive, thus indicating a faulty transistor. The value of $I_{co}$ for most satisfactory transistors is less than 50 microamperes. If the meter being used is not sufficiently rugged to momentarily withstand the overload current should a faulty transistor be encountered, an additional protective resistor may be inserted in series with resistor R. The protective resistor is shunted by a push-button switch for reading purposes. As this is conventional in the meter art, it is not specifically disclosed in the accompanying drawings.

Figure 2:
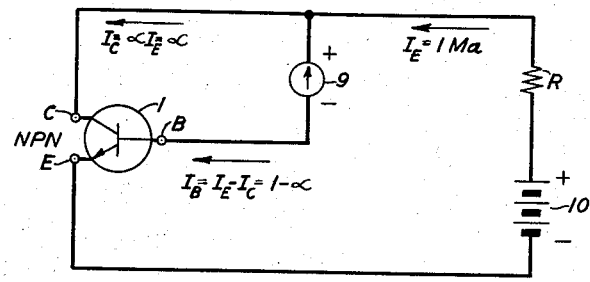
Fig. 2 shows the circuits of Fig. 1 set up for indicating the current amplification factor.

Switch 11 is now thrown to the right to set up the circuits shown in Fig. 2. When the emitter circuit is connected, the collector current increases to many times that previously measured with the emitter circuit open. This current is equal to the emitter current multiplied by the current amplification factorm $\alpha$. Since the value of alpha generally lies between 0.95 and unity, it is evident that most of the emitter current enters the transistor by way of the collector electrode. The collector current $I_{co}$ previously measured is negligibly small compared with the collector current when the emitter is carrying current so that the current $I_{co}$ is neglected. Under the conditions established for the circuit of Fig. 2, the resistance between the collector and emitter is relatively low compared with the series resistance R so that the current $I_e$ flowing through the emitter circuit is maintained constant at substantially 1 milliampere. Since the emitter current is 1 milliampere, the collector current $I_c$ is equal to $\alpha$ milliamperes. The meter current flowing into the base electrode of the transistor is equal to the difference between these two currents or $(1-\alpha)$ milliamperes. This establishes the scale for the current amplification factor for meter 9 shown in Fig. 4.

While the invention has been described with reference to a specific embodiment shown in Fig. 1, it is quite evident that different switching means may be employed for establishing the circuits shown in Figs. 2 and 3. It is equally evident to those skilled in the art that different values of battery voltage and series resistance may be employed to obtain the same results. Moreover, various types of constant direct-current supplies are known so that any of these may be substituted for the one shown in illustrating this invention without departing from the scope of the invention. For simplicity, however, it is preferred that this constant current source merely comprises the small battery and series resistor as described above.

What is claimed is:

1. Apparatus for measuring the current amplification factor of a transistor comprising means for connecting to the emitter, the base and the collector electrodes of a transistor to be tested, a source of substantially constant direct current, a circuit connecting said source in series with the collector and emitter electrode connecting means whereby a substantially constant current may be caused to flow through the emitter electrode, and a current indicating means connected between the base electrode connecting means and the collector electrode connecting means.

2. The combination of claim 1 wherein said constant current source comprises a resistor connected in series with a battery.

3. The combination of claim 1 wherein said current indicating means includes a scale calibrated to directly indicate the current amplification factor.

4. Apparatus for measuring the current amplification factor of a transistor comprising a source of direct current, a socket having terminals for receiving the emitter, the base and the collector terminal pins of the transistor, a resistor connected in series with the source and the collector and emitter terminals of the socket, and a current indicating means connected between the collector and base terminals of the socket.

5. The combination of claim 4 wherein said current indicating means includes a scale calibrated to directly indicate the current amplification factor.

6. Apparatus for measuring the current amplification factor of a transistor comprising a socket having terminals for receiving the emitter, the base and the collector terminal pins of the transistor, a source of substantially constant direct current, a current indicator, a multi-position switching means, one position whereof is adapted to connect said constant current source in series with the collector and emitter terminals of the socket and the current indicator between the collector and base terminals of the socket, and another position is adapted to connect said current source in series with said current indicator and the collector and base terminals of the socket.

7. The combination of claim 6 and a polarity reversing switch means, one position whereof is adapted to connect both said source and said current indicator in one polarity sense and the other position adapted to reverse their polarities.

8. The combination of claim 6 wherein said constant current source comprises a resistor connected in series with a battery.

9. The combination of claim 6 wherein said current indicating means includes a scale calibrated to directly indicate the current amplification factor.

References Cited in the file of this patent

"CQ" Radio Amateurs Journal, September 1954, pp. 31, 32, 33, 58, 59, 60.

I.R.E. Convention Record, vol. 3, part 10, 1955, pp. 130–138. Presented at the I.R.E. Nat'l. Convention, New York, March 21–24, 1955.

"Practical Transistor Tests," Radio Electronics, July 1955, pp. 32–34.

"Principles of Transistor Circuits," R. F. Shea, pp. 495, 496.

"Vacuum Tube Circuits and Transistors," L. B. Arguimbau, p. 135.